United States Patent
Holmes

(10) Patent No.: US 12,248,522 B2
(45) Date of Patent: Mar. 11, 2025

(54) RAPID BOX INDEXING

(71) Applicant: TAPE ARK, East Perth (AU)

(72) Inventor: Guy Holmes, East Perth (AU)

(73) Assignee: TAPE ARK, East Perth (AU)

(*) Notice: Subject to any disclaimer, the term of this patent is extended or adjusted under 35 U.S.C. 154(b) by 0 days.

(21) Appl. No.: 17/707,494

(22) Filed: Mar. 29, 2022

(65) Prior Publication Data

US 2022/0309110 A1 Sep. 29, 2022

Related U.S. Application Data

(60) Provisional application No. 63/167,492, filed on Mar. 29, 2021.

(51) Int. Cl.
| | |
|---|---|
| G06F 16/90 | (2019.01) |
| G06F 16/55 | (2019.01) |
| G06F 16/93 | (2019.01) |
| G06V 20/40 | (2022.01) |
| G06V 30/412 | (2022.01) |

(52) U.S. Cl.
CPC ............ *G06F 16/93* (2019.01); *G06F 16/55* (2019.01); *G06V 20/46* (2022.01); *G06V 30/412* (2022.01)

(58) Field of Classification Search
CPC .......... G06F 16/51; G06F 16/55; G06F 16/93
See application file for complete search history.

(56) References Cited

U.S. PATENT DOCUMENTS

| | | | | |
|---|---|---|---|---|
| 7,423,777 | B2* | 9/2008 | Jiang | H04N 1/32529 |
| | | | | 358/1.18 |
| 9,495,614 | B1* | 11/2016 | Boman | G06F 16/29 |
| 9,817,625 | B1* | 11/2017 | Chun | G06F 16/5866 |
| 10,270,983 | B1* | 4/2019 | Van Os | H04N 7/147 |
| 11,663,824 | B1* | 5/2023 | Strader | G06V 20/60 |
| | | | | 382/103 |
| 2005/0140791 | A1* | 6/2005 | Anderson | G11B 27/105 |
| | | | | 386/230 |

(Continued)

OTHER PUBLICATIONS

Article entitled "DrawerFinder: Finding Items in Storage Boxes using Pictures and Visual Markers", by Komatsuzaki et al., dated Feb. 16, 2011 (Year: 2011).*
Article entitled "Tape Ark and AWS Invent an Out-of-the-box Archiving Solution", by Amazon, dated 2021 (Year: 2021).*
"Amazon Textract Developer Guide", Copyright 2023.

(Continued)

*Primary Examiner* — Mahesh H Dwivedi
(74) *Attorney, Agent, or Firm* — Polsinelli PC

(57) ABSTRACT

The present invention is a system and method for creating a digital and searchable inventory of physically stored, items, objects, or documents. Methods and apparatus of the present disclosure may image physical items as a person removes them from a container. This person may also provide verbal descriptions of items being imaged. Artificial intelligence, such as object recognition, optical character recognition, or natural language processing, may then applied to the captured data to classify the items into a searchable hierarchy. The digital classification of the items and their attributes may be linked to a machine-readable ID, such as a barcode or other identifier, that may allow the items scanned to be associated with a specific physical storage device. This may include using identifiers that were originally on a container and by associating new identifiers with the container.

23 Claims, 5 Drawing Sheets

(56) References Cited

U.S. PATENT DOCUMENTS

| | | | | |
|---|---|---|---|---|
| 2008/0041947 | A1* | 2/2008 | Hollister | G06Q 10/08 |
| | | | | 340/572.1 |
| 2009/0087094 | A1* | 4/2009 | Deryagin | G06V 30/416 |
| | | | | 382/180 |
| 2010/0011297 | A1* | 1/2010 | Tsai | G06F 16/743 |
| | | | | 715/721 |
| 2010/0165119 | A1* | 7/2010 | Tang | H04N 23/64 |
| | | | | 348/207.11 |
| 2012/0017238 | A1* | 1/2012 | Miller | H04H 60/48 |
| | | | | 725/32 |
| 2012/0257876 | A1* | 10/2012 | Gupta | G11B 27/034 |
| | | | | 386/E5.028 |
| 2014/0219626 | A1* | 8/2014 | Weber | H05K 5/03 |
| | | | | 361/679.01 |
| 2015/0161198 | A1* | 6/2015 | Clift | G06F 16/58 |
| | | | | 707/705 |
| 2017/0154240 | A1* | 6/2017 | Vogiatzis | H04N 7/185 |
| 2018/0357594 | A1* | 12/2018 | Rabibadhana | G06Q 10/087 |
| 2019/0147279 | A1* | 5/2019 | Liu | G06V 30/2504 |
| | | | | 382/181 |
| 2020/0042621 | A1* | 2/2020 | Frank | G06F 40/169 |
| 2020/0285669 | A1* | 9/2020 | Breedvelt-Schouten | |
| | | | | A61B 5/16 |
| 2021/0124953 | A1* | 4/2021 | Mirza | G06T 7/246 |
| 2022/0292288 | A1* | 9/2022 | DeSantola | G06V 20/52 |

OTHER PUBLICATIONS

"Amazon Textract FAQs", https://aws.amazon.com/ptextract/faqs/ 3/10, Downloaded Jun. 23, 2023.
"Amazon Simple Storage Service User Guide", API Version Mar. 1, 2006.
"Amazon Simple Storage Service S3 FAQs", https://aws.amazon.com/s3/faqs/, Downloaded Jun. 23, 2023.
"Amazon Rekognition Developer Guide", Downloaded Jun. 23, 2023.
"Amazon Rekognition FAQs", https://aws.amazon.com/rekognition/faqs/, Downloaded Jun. 23, 2023.
"AWS Lambda Developer Guide", Copyright 2023.
"AWS Lambda FAQs", https://aws.amazon.com/lambda/faqs/, Downloaded Jun. 23, 2023.
"Amazon S3 Glacier Developer Guide", API Version Mar. 1, 2012.
"Amazon Comprehend Developer Guide," Copyright 2023.
"Amazon Comprehend FAQs", https://aws.amazon.com/comprehend/faqs/, Downloaded Jun. 23, 2023.
Sobey, Charles H., "Drive-Independent Data Recovery: The Current State-of-the-Art," https://www.channelscience.com/files/Drive%20Independent%20Data%20Recovery%20Sobey%20Orto%20Sakaguchi%20TMRC%202005%20D5%20PREPRINT.pdf, accessed Jun. 7, 2024.
Sobey, Charles H., "Recovering Unrecoverable Data The Need for Drive-Independent Data Recovery," https://www.channelscience.com/files/Drive-Independent_Data_Recovery.pdf, accessed Jun. 7, 2024.

* cited by examiner

RAPID BOX INDEXING

CROSS-REFERENCE TO RELATED APPLICATIONS

The present application claims the priority benefit of U.S. provisional application No. 63/167,492 filed Mar. 29, 2021, the disclosure of which are incorporated herein by reference.

BACKGROUND OF THE INVENTION

Field of the Disclosure

The present disclosure is generally related to the digitizing of physical records. More specifically the present disclosure is directed to and accurate and efficient digitizing process.

Description of the Related Art

Many industries have record retention guidelines that may be self-imposed, designated by a regulatory body, or accepted best practices in a given industry. This may lead to a buildup of records/objects in physical storage that are difficult to track, inventory, or retrieve when necessary. Digitization services may collect physically stored documents and scan them into a computer to create a digital inventory of a physical medium. Current record digitization services may feed paper records into a scanner to create a pdf or other digital version of physical records (e.g. documents). The physical scanning of a standard legal box of records may take upwards of an hour per box. The images of the scanned documents must then undergo another processing step to make the data searchable in any meaningful way. This is very labor intensive and in many instances much of the data collected is never again used.

It is therefore desirable to have a method of digitizing physical storage media into a searchable database quickly and efficiently.

SUMMARY OF THE PRESENTLY CLAIMED INVENTION

The presently claimed invention relates to a method, a non-transitory computer readable storage medium, and an apparatus that collects and characterizes collected data. In a first embodiment, a presently claimed method may include performing the steps of collecting data that identifies a receptacle that contains a set of materials that include one or more documents, capturing images of a portion of the one or more documents included in the set of materials, identifying characteristics included in each image of each of the document portions, generating a set of data that cross-references the receptacle identifier and the characteristics included in each of the images, and storing the set of data as part of an inventory.

In a second embodiment, the presently claimed method is implemented as a non-transitory computer readable storage medium where a processor executes instructions out of a memory. Here again the method may include the steps of collecting data that identifies a receptacle that contains a set of materials that include one or more documents, capturing images of a portion of the one or more documents included in the set of materials, identifying characteristics included in each image of each of the document portions, generating a set of data that cross-references the receptacle identifier and the characteristics included in each of the images, and storing the set of data as part of an inventory.

In a third embodiment, the presently claimed invention is an apparatus that includes a sensor that collects data that identifies a receptacle that contains a set of materials that include one or more documents, a camera that captures images of a portion of the one or more documents included in the set of materials, a memory, and a processor that executes instructions out of the memory. The processor may execute instructions out of the memory to identify characteristics included in each image of each of the document portions, generate a set of data that cross-references the receptacle identifier and the characteristics included in each of the images, and store the set of data as part of an inventory.

DESCRIPTIONS OF THE DRAWINGS

DETAILED DESCRIPTION

The present invention is a system and method for creating a digital and searchable inventory of physically stored, items, objects, or documents. Methods and apparatus of the present disclosure may image physical items as a person removes them from a container. This person may also provide verbal descriptions of items being imaged. Artificial intelligence, such as object recognition, optical character recognition, or natural language processing, may then applied to the captured data to classify the items into a searchable hierarchy. The digital classification of the items and their attributes may be linked to a machine-readable ID, such as a barcode or other identifier, that may allow the items scanned to be associated with a specific physical storage device. This may include using identifiers that were originally on a container and by associating new identifiers with the container. In certain instances, users may only image portions of individual documents such that the documents can be quickly characterized.

Figure 1:
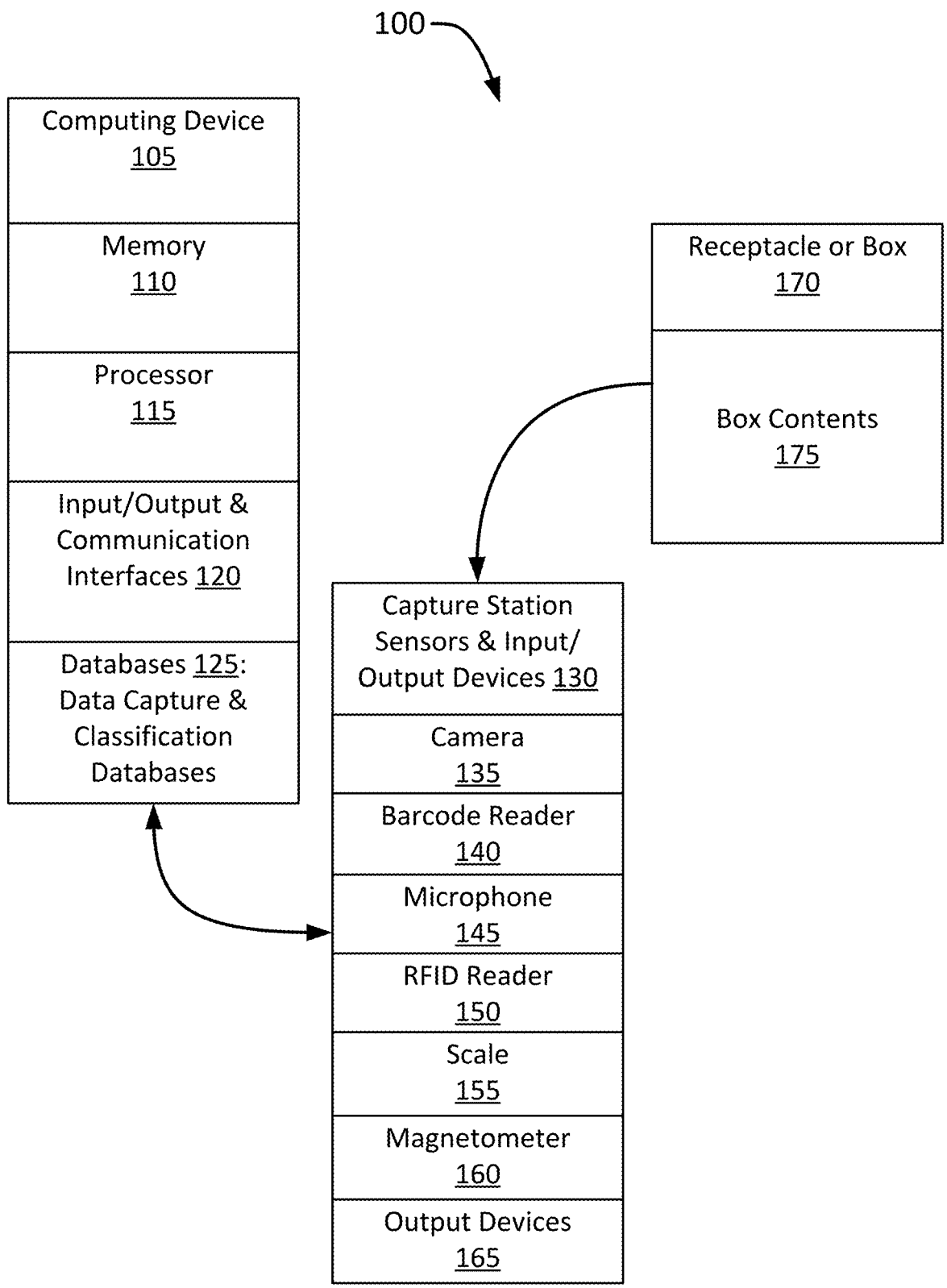
FIG. 1 illustrates a rapid box indexing system.

FIG. 1 illustrates a rapid box indexing system. This system 100 may be include computing device 105, sensors & input/output devices 130 of a capture station, and a number of boxes 170. Computing device 105 includes memory 110, processor 115, input/output communication interfaces 120, and data capture & classification databases 125. The instructions stored in memory 110 may include instructions that when executed allow a processor to capture data and classify that captured data. Receptacles or boxes 170 may be constructed of any material, such as plastic, fiberboard, cardboard etc. Here boxes 170 include contents 175 that need to be classified or characterized. A box may be any form of receptacle, such as a container, a file folder, a crate, a jar, a tank, a tub, or a package, essentially any receptacle that is capable of holding items or documents. Capture station 130 includes sensors & input/output (I/O) devices. These sensors or I/O devices may include a camera 135, a barcode reader 140, a microphone 145, a radio frequency identifier (RFID) reader 145, a scale 155, a magnetometer 165, and output devices 165. Computer 105 may be communicatively coupled to a capture station 130 via a direct network connection, such as Ethernet, a wireless connection, such as Wi-Fi, or integrated into one or more of the hardware pieces at the capture station 130. Boxes 170 may be part of a project in which the owners of the boxes 170 are legally required to maintain records of contents included in specific boxes. The term "scan" may include single or multiple forms of imaging, such as optical, acoustic, laser scanning, radar, thermal, and seismic-based imaging. A data capture database of databases 125 may store data collected at the capture station 135. Data from the capture station 130 may include video data from one or more cameras 135. Barcode reader 140 may be used to collect box identifying information, audio data may be captured by one or more microphones 145, and data from an RFID chip may be captured by an RFID reader 150. The data capture database may be populated with data collected from based on execution of instructions of a capture software module. Boxes may include or be associated with more than one identifier. For example, the box identifiers may be a series of stickers with a barcode printed on them or they may include text written on a box. The data capture database may store a table of data for each box associated with a project.

When a box identifier is scanned using the barcode reader 140, all data captured by the camera 135, barcode reader 140, microphone 145, RFID reader 150, scale 155 and magnetometer 160, may be stored in databases 125 and this data may be associated with a particular box identifier. A classification database of databases 125 may store data after that data has been classified.

Instructions of a data capture software module may allow a processor to collect data from the capture station 130 and associate that data with a box identifier and then the processor 115 may store that associated data in a data capture database of databases 125. The first scan of a given box identifier by the barcode reader 140 may begin the association of content 175 with a specific box 170. A second scan of the same box identifier may indicate that a particular box 170 has had all of its contents 175 inventoried (i.e. scanned and classified or characterized). This process may include the processor 115 of computing device 105 processing the data in the data capture database, when a digital searchable inventory of a set of boxes and their contents are created.

In one instance, optical character recognition (OCR) may be used to identify written words on documents, objects, or in images. Speech to text translation of a verbal description of the contents 175 of box 170 that were uttered by a user may be captured by microphone 145. An RFID or other similar near field communications devices may have their data ingested by the RFID reader 150. Scale 155 may be used to record a weight of box 170. Obtaining a box weight may be used to determining how heavy box 170 is at start point and at an end point of a data collection and classification process. An initial box weight may be used to identify whether a box is empty before it has been opened by a user or may be used to validate that a box has been completely emptied. In certain instances, a magnetometer 160 may be used to record the magnetic field of the contents of a box. Magnetometer data may be used to identify whether magnetic material is included in box 170.

Artificial intelligence (AI) may be applied to an object recognition process on any image of an object. As such, AI may be used to identify some of the contents 175 included in box 170. Natural language processing (NPL) may be applied to text identified through OCR to determine a sentiment or tone to associate with contents of a box. Such sentiments may be related to a positive sentiment, a negative sentiment, or a neutral sentiment of a given item.

A hierarchical structure may be applied to the collected data. For example, a name and a mailing address may be interpreted as the name being at the top of a hierarchy and a street address may be designated as the 'child' of the 'parent' name. In another example, a hierarchy may include three levels, with the addressee being the first level or parent, the street address being a second level or child, and the city, state, and postal code, may be a third tier or grandchild. Text, objects, or images may be identified as having a designated place in the hierarchy. For example, a law firm may have their client list input as having a predefined place in the hierarchy. They may be automatically assigned to the second tier in the hierarchy below the law firm partner who handles their cases. Some or all of the classifications made by processor 115 executing instructions of a data classification software module may have a confidence level associated with them. For example, an object recognition process may identify an elephant in a picture and indicate that it is 92% confident in that identification.

Capture station 130 may allow a user to scan the contents 175 of a number of boxes 170 such that captured data may be stored in data capture database of databases 125. A data capture station may include, at least one camera 114, barcode reader 116, microphone 118, and RFID reader 120. In certain instances, a full scanning area of capture station 130 may be visible to a field of view of camera 153. The user may place the box 170 on one side of the scanning area within capture station 130, scan a box identifier of the present box 170, and begin placing the contents 175 in the scanning area one at a time. As each item in box 170 are passed into the field of view of camera 135, a current document or object being viewed may be described verbally by a user while the object is under the camera 135. Once all contents 175 have been scanned, they may be returned to the present box 170. The user may then scan the box identifier for the present box 170 a second time to indicate that data collection for the present box 170 has been completed.

Camera 135 may be the rear-facing camera on a tablet, smartphone, or other computing device. Barcode reader 140 or other optical scanners may be capable of ingesting data represented in a visual, machine-readable form such as a barcode, QR code, or universal product code (UPC). In one instance, barcode reader 140 may be a wireless handheld scanner. Microphone 145 may be integrated into the tablet or computer that contains the camera 135. Output devices 165 may be a display or a speaker that may provide commands to a user. Such a command may include instructing the user to scan (show to the camera) additional portions of a particular document. For example, in an instance when processor 115 identifies that a particular document (e.g. a file folder, notebook, or report) is of a type of interest, the user may be asked to scan a table of contents or some other portion of the document. This additional information may allow the processor to better classify a document.

Table 1 illustrates data that may be stored data capture database. Each data capture project may begin with the creation of a number of box identifiers. In one instance, the box identifiers are barcodes that may include or encode a name assigned by the box owner and an identifier associated with that box identifier. The identifier may vary in style or number of digits but is designed to uniquely identify a specific box. The box identifiers may each have or be associated with a table that may populate the contents of the box with. The box identifier may be printed on a sticker that is then affixed to the box. The data included in the capture database may cross-reference various types of information. This process may associate video data captured by a camera with a box identifier.

Data associated with a box, or its contents, may be captured by a microphone, RFID reader, barcode reader, scale, or magnetometer. Each data point captured may have a timestamp associated with it so a processor may associate data captured with a corresponding time in a set of video data. This may allow a user to capture data with the barcode reader before they scan a box identifier. In one instance, the processor may store some number of barcodes captured in a blank table in a data capture database. A scale may be used twice at a start point and at an end point of a data collection and classification process.

Once a box identifier has been scanned, all barcode data may be stored in association with the scanned box identifier. In certain instances, descriptive data may be captured from a microphone or an RFID reader before the box identifier is scanned. Data captured after the box identifier is scanned may have a timestamp associated with it. An initial scanning of a box identifier may prompt the processor to initiate recording video data associated with the present box identifier. Data captured before the box identifier is scanned may list a sequence of identifiers in a "queue" entries in place of a timestamp. Note that table 1 cross-references a type of data (video, audio, RFID, barcode, weight, magnetic field) with a type of data (MP3, MP4, RFID data, bar code data, weight data, or magnetic field strength data).

a box identifier with each object included in a box. All of the objects that make up the contents of a box may have a unique identifier assigned to them. In one instance, an object identifier may be a combination of the box identifier, a timestamp in a video indicating a time when an object was identified. An index of information related to an object may be generated. For example, OCR may identify words on the page.

In certain instances, AI may be applied to identify objects or images. For example, an image may contain a commonly identifiable object, such as two dogs. A processor executing instruction of a set of AI software may identify that there are two dogs in the picture, that one is a husky, and the other a dalmatian. This processor may also identify that there is snow in the background behind the dogs. In some instances, AI software may be trained to recognize objects and images specific to a field of art. For example, an image recognition system may be trained to identify different valve types symbols that relate to oil and gas application. The sentiment, such as positive, negative, or neutral, of an object may be indicated in a set of classification data.

Text gathered from execution of an OCR process or a speech to text recognition process, may be examined for sentiment. Facial expressions of a person in an image may be examined for sentiment, such as happy or sad. Furthermore, an audio description provided by the user may be

TABLE 1

| | | | Data Capture Database Data | | | | |
|---|---|---|---|---|---|---|---|
| XYZ Corp - Box 12345 | Queue | | | TIME | | | |
| Video | | | | BOX12345.mp4 | | | |
| Audio | Audio 1.mp3 | Audio 2.mp3 | Audio 3.mp3 | Audio 4.mp3 | Audio 5.mp3 | Audio 6.mp3 | Audio 7.mp3 |
| RFID | RFID1.dat | | | | | | |
| Barcodes | BC1.dat | BC2.dat | BC3.dat | | | | |
| Weight | Weight.dat | | | | | | |
| Magnetic Field | FieldStrength.dat | | | | | | |

Table 2 illustrates data that may be stored in a database that may include classification data. This classified data may be stored as part of a classification process. In one instance a database may store a set of tabulated data that associates stored as text. Each piece of information characterized may have a confidence level associated with its identification. Each piece of information in an index of information may have an identifier associated with it.

TABLE 2

| Classified Database Data | | | | | |
|---|---|---|---|---|---|
| XYZ Corp-Box 12345 | | | | | |
| Object ID | XYZ12345_0_0.12728770804918646 | | | | |
| Object type | Commercial_item | | | | |
| Sentiment | Neutral | | | | |
| User description | GEM-89-137 5 I Tab Products Co Spacefinder Systems Model 1189-5 | | | | |
| Object index | confidence | id | Type | parent_id | level_0 |
| OUT 1614O8 OUT | 86.19007874 | 0 | LINE | | |
| em | 76.11706543 | 10 | WORD | 1 | |
| GEM-89-137 | 94.56819916 | 11 | WORD | 2 | 0 |
| Tab Products Co Spacefinder Systems | 95.38641357 | 3 | LINE | | 3 |
| Model 1189-50% 1 | 86.48923492 | 4 | LINE | | |
| White. 2 Blue. Green 4 Gray Canary | 92.31440735 | 5 | LINE | | |
| 6 Orange Pink, 8 Red Lavender Goldenrod | 91.67211151 | 6 | LINE | | |
| OUT | 97.80426025 | 9 | WORD | 0 | |
| 1614O8 | 66.18653107 | 8 | WORD | 0 | |
| Tab | 95.62341309 | 12 | WORD | 3 | |
| Products | 95.69989777 | 13 | WORD | 3 | |
| Co | 92.67428589 | 14 | WORD | 3 | |

TABLE 2-continued

Classified Database Data

| | | | | |
|---|---|---|---|---|
| Spacefinder | 95.52374268 | 15 | WORD | 3 |
| Systems | 97.41070557 | 16 | WORD | 3 |
| Model | 95.15306854 | 17 | WORD | 4 |
| 1189-50% 1 | 77.82540894 | 18 | WORD | 4 |
| White. 2 | 86.10601044 | 19 | WORD | 5 |
| Blue. | 92.89308167 | 20 | WORD | 5 |
| Green | 94.2473526 | 21 | WORD | 5 |
| 4 Gray | 92.68960571 | 22 | WORD | 5 |
| Canary | 95.63598633 | 23 | WORD | 5 |
| 6 Orange | 96.11986542 | 24 | WORD | 6 |
| Pink, | 90.46173096 | 25 | WORD | 6 |
| 8 | 90.81237793 | 26 | WORD | 6 |
| Red | 88.93644714 | 27 | WORD | 6 |
| Lavender | 92.64627838 | 28 | WORD | 6 |
| Goldenrod | 91.05595398 | 29 | WORD | 6 |
| 5 | | | | 1 |
| I | | | | 2 |
| Model 1189-5(Å°) | | | | 4 |
| (*) 1 White 2 Blue, 3 Green, 4 Gray 5 Canary | | | | 5 |
| 6 Orange. 7 Pink, 8 Red. 9 Lavender, o Goldenrod | | | | 6 |

Figure 2:
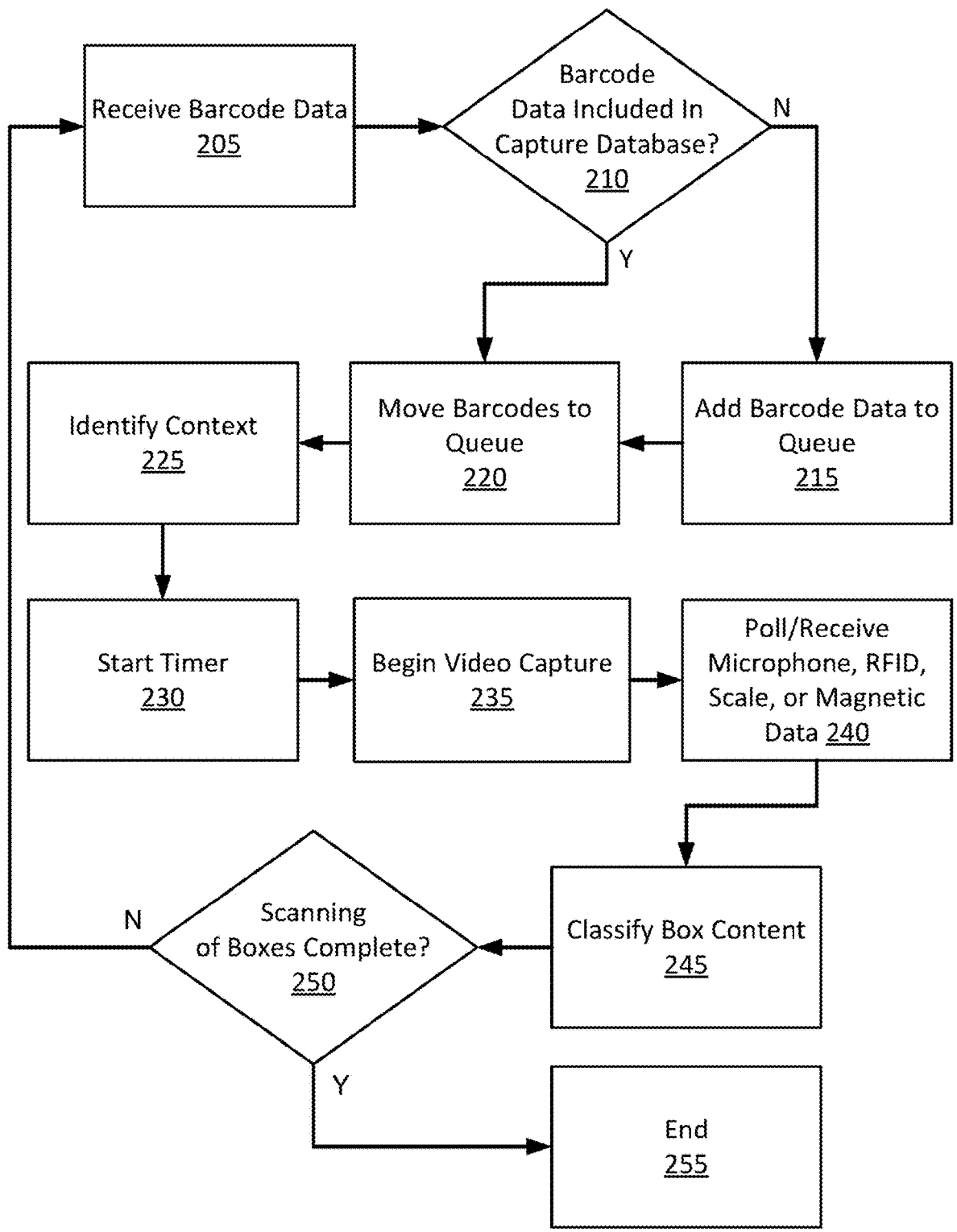
FIG. 2 illustrates a series of steps that may be performed when data included in a receptacle is collected and classified.

FIG. 2 illustrates a series of steps that may be performed when data included in a receptacle is collected and classified. First, in step 205 bar code data or other data unique to the receptacle are collected. This may include the scanning scan of a barcode or other identifier (e.g. an RFID chip). Next, determination step 210 may identify whether the bard code or other box identifying data has been received before. In an instance when the barcode data is not associated with a box identifier, a temporary record may be created, at step 215 of FIG. 2 and this data may be associated with the barcode. A user may scan multiple barcodes that already appear on the box before a box identifier is scanned. In certain instances, a box identifier may be an identifier associated with a customer or may be generated from data that a customer uses to identify the box. After step 215, program flow may move to step 220 described below.

Alternatively, when the barcode or other identifier has previously been scanned, previously collected data may be retrieved, at step 220 of FIG. 2. A context associated with a set of data may be identified in step 225. The context of the scanning may include but is not limited to, the time of day, location, subject, etc. For example, the context of the current scan may be 12:45 PM on Friday, Feb. 19, 2021. This is the 32nd box 122 being scanned for XZY Oil & Gas Corp. at their Oklahoma City Oklahoma storage facility. This context data may be used to categorize or distribute data. A timer may be started at step 230. Video capture may begin, at step 235. Data from sensing devices (microphone, RFID, scale, or magnetometer) may be polled as discussed in respect to FIG. 1.

In this manner, data may be captured on each and all items that make up the contents of a box. Step 245 may include classifying the box content based on execution of instructions that evaluate data or that perform an AI function. Step 245 may be performed after the scanning of the contents of the present box is complete. Next, determination step 250 may identify whether the scanning of a set of boxes content are complete. When the scanning of the set of boxes are not complete, program flow may move back to step 205 where barcode data of another box is received. When the scanning of the set of boxes is complete, program flow may move to step 255 where FIG. 2 ends.

Figure 3:
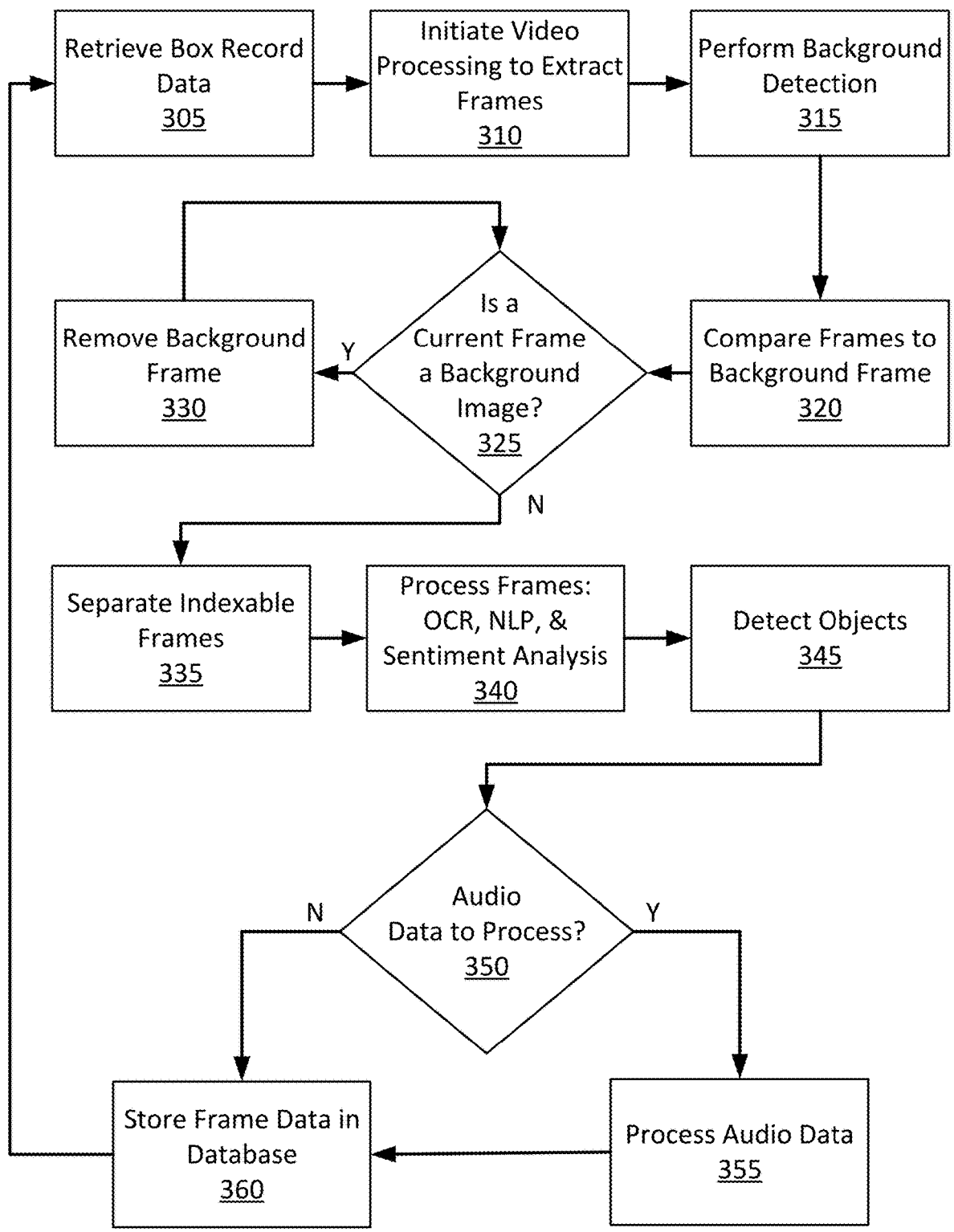
FIG. 3 illustrates a set of steps that may be performed when data associated with a receptacle is classified.

FIG. 3 illustrates a set of steps that may be performed when data associated with a receptacle is classified. Step 305 of FIG. 3 includes retrieving data of a box record or file. This data may be associated with a box identifier that includes content that was previously scanned. Image or video data may be segmented into a series frames from which still images of content may be generated. Each video frame in a set of video data may be analyzed. In one instance, an indication may be received to identify a subset of frames that are to be analyzed. For example, only frames that have an audio file associated with the same timestamp may be examined.

In certain instances, the hands of a user may be tracked and the subset of frames in which their hands are not present may be examined. In one instance, background detection will be carried out in step 315 to determine what the video static background is. Background frames may be identified based on the appearance of a frame that does not include anything else but a known background image. For example, a background may include a black color with white vertical and horizontal lines. In certain instances, sets of lines may be separated by a distance such that a scale may be identified. Respective frames may be compared to a background frame in step 320. Determination step 325 may then identify whether a particular frame is a background frame. Step 325 may also identify frames that include a user's hands. When a frame includes only the background or includes the user's hands, that frame may be removed in step 330. After step 330, program flow may move back to determination step 325. When determination step identifies that particular frames should not be removed, program flow may move to step 335 where the frame(s) is/are stored as an indexable snapshot of frame data. These indexed frame snapshots may then be processed in step 340 of FIG. 3. This processing may include OCR, NLP, and/or sentiment analysis. Objects may then be detected in step 345 of FIG. 3.

In certain instances, the video being processed may be have the individual frames saved at a database. The system may take frames 2 to 50 and overlay them on each other to create an average, for example. The first 2 seconds of the video may be an empty background as users may be instructed not to place anything on the background until they start the video. The frames 2 to 50 may then be averaged to account for camera shake and shadows that may distort the appearance of an object. The average of these frames may be used to identify the background to which all other frames are compared. This means that a background image may be identified via an AI process.

In an instance when a frame displays a difference above a threshold, for example 5× different, when compared to the background, it is kept as a candidate for a frame that may be relevant. Adjoining frames are compared for velocity as motion can also affect the quality of a particular frame. This may include determining whether anything is moving across the image for some number of frames. For example, until 5 consecutive frames are associated with a zero velocity. A difference plot may be made of the background vs the image to remove the background from the relevant image. A halo identifier may then be created around the image. For example, a halo may span approximately 10 pixels may be used as a delineator between an area of relevance and a background area. This may allow for the creation of a "clean edge" or the identification that a still image is clean. The image may then re-sized and or rotated for OCR extraction. OCR may be performed, at step 340 on any identified text. A hierarchy may be identified, this hierarchy may be based on the character's position on or within an object. This may help identify a header or a title of a document. This header or title may be designated as being the parent of a hierarchy and other text may be designated as a child of the hierarchy. A hierarchy may also be based on the characteristics of the content. For example, a company logo appearing on the page may automatically be at or near the top of the categorization hierarchy.

Object recognition may be performed, at step 345. Object recognition may be used to identify physical objects or images. There are many object recognition systems known in the art. In addition to items that are commonly known, some embodiments may have object recognition systems that may be trained to recognize objects that are specific to a given application. For example, an oil and gas company may need an object recognition system that can differentiate between several similar-looking valves in a series of pictures. It may then be determined, at step 350 whether there is audio data associated with the frame being examined. When there is audio data present, speech to text conversion may be performed at step 355. In one example, a user may provide a verbal description of the object being imaged.

This process may include identifying a sentiment at step 360. This sentiment may have been identified based on use of NLP. Alternatively, or additionally, the sentiment of people in an image may be determined through AI based on facial cues. The identified information about a frame may be stored at a database that stores classified data in step 360. When determination step identifies that there no audio to process, program flow may move to step 360 where classified data is stored at the database.

Figure 4:
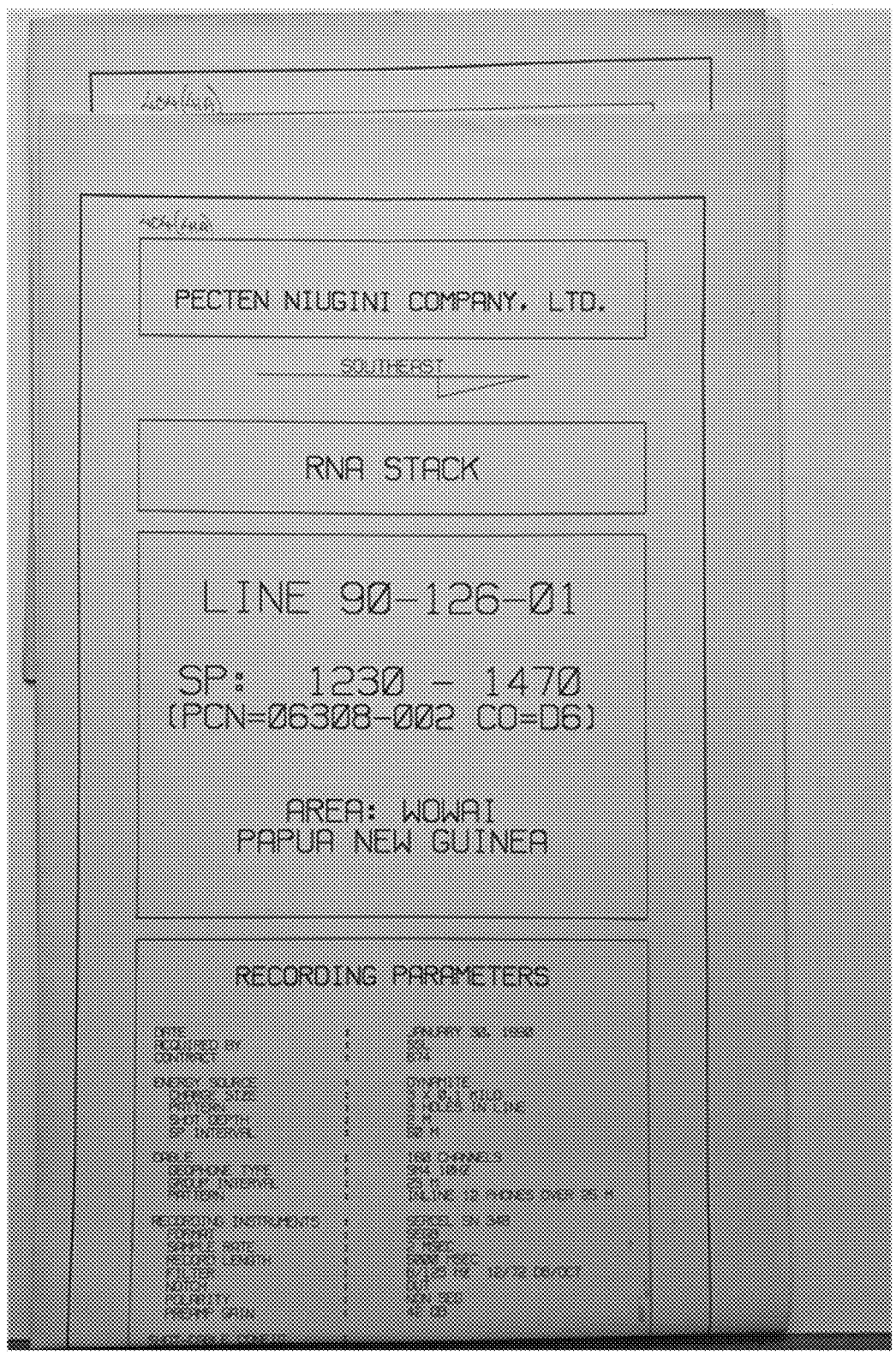
FIG. 4 illustrates an example of content that may be included in a receptacle.

FIG. 4 illustrates an example of content that may be included in a receptacle. The image of FIG. 4 may be a frame from a video captured by a camera. Optical character recognition may be used to identify a geographical location or locations of "southwest," "Wowai" and "Papau New Guinea" from text included in the image. Optical character recognition may be used to identify the recording instrument used of "SERCEL SN 348." Note that "Pecten Niuginig Company, LTD" may be identified as a parent in a hierarchy and details like "RNA Stack" or other text may be identified as being a child in this hierarchy.

Figure 5:
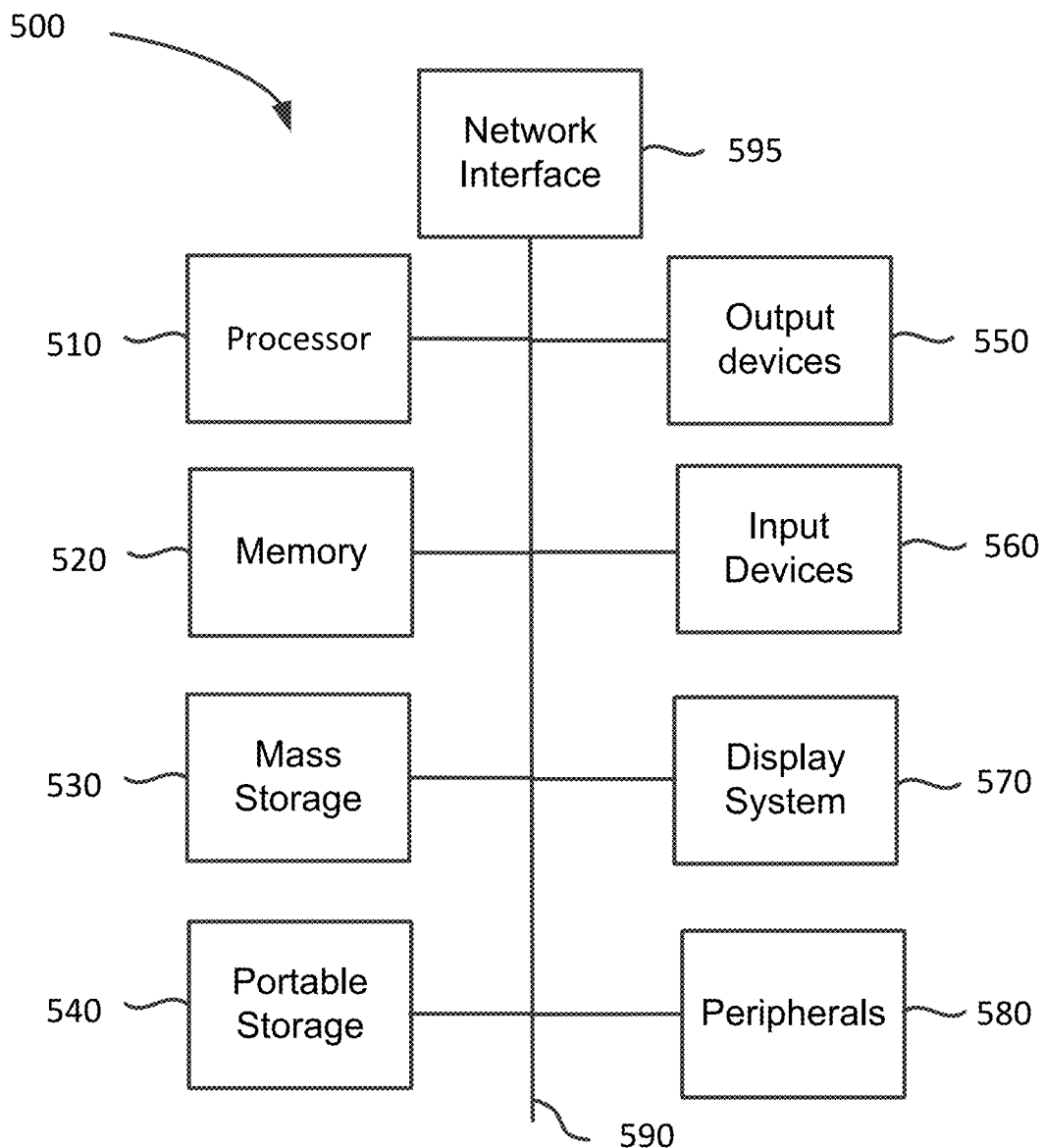
FIG. 5 illustrates a computing system that may be used to implement an embodiment of the present invention.

FIG. 5 illustrates a computing system that may be used to implement an embodiment of the present invention. The computing system 500 of FIG. 5 includes one or more processors 510 and main memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, peripheral devices 580, and network interface 595.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a FLASH memory, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD), a plasma display, an organic light-emitting diode (OLED) display, an electronic ink display, a projector-based display, a holographic display, or another suitable display device. Display system 570 receives textual and graphical information, and processes the information for output to the display device. The display system 570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 580 may include any type of computer support device to add additional functionality to the computer system. For example, peripheral device(s) 580 may include a modem or a router.

Network interface 595 may include any form of computer interface of a computer, whether that be a wired network or a wireless interface. As such, network interface 595 may be an Ethernet network interface, a BlueTooth™ wireless interface, an 802.11 interface, or a cellular phone interface.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 500 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory/disk, a hard disk, magnetic tape, any other magnetic medium, a CD-ROM disk, digital video disk (DVD), any other optical medium, RAM, PROM, EPROM, a FLASH EPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for generating an inventory, the method comprising:
    collecting data that identifies a receptacle that contains a set of materials that include one or more objects;
    capturing video data of the one or more objects included in the set of materials, the video data including a series of frames;
    comparing a velocity of the objects in adjoining frames within the series of frames;
    identifying one or more frames of the adjoining frames as relevant based on identifying that the velocity is above a threshold;
    identifying an object image of one or more of the objects within a part of a frame from the relevant frames, wherein the part of the frame associated with the identified object image is delineated from a part of the frame associated with a background area;
    analyzing the object image within the frame to identify individual characteristics;
    classifying each of the one or more objects in the object image into a searchable hierarchy based on the identified characteristics;
    generating a set of data that cross-references a receptacle identifier and the characteristics included in each of the frames; and
    storing the set of data as part of the inventory.

2. The method of claim 1, further comprising:
    identifying that a start indication has been received, the start indication identifying that the capture of the video data can be initiated; and
    initiating the capture of the video data.

3. The method of claim 1, further comprising:
    identifying a background included in the set of video data when a piece of the set of materials originally contained in the receptacle is not within a field of view of a camera capturing the set of video data;
    identifying that the field of view of the camera includes a first object of the one or more objects that was originally contained in the receptacle; and
    identifying that the first object is a document.

4. The method of claim 3, further comprising:
    receiving audio data when capturing the captured video data;
    converting information included in the audio data to text;
    converting information included in the set of video data into a first still image of the captured video data; and
    associating a first still image of the captured video data with the text based on the audio data being received at a time when the first still image was captured.

5. The method of claim 1, further comprising:
    providing a command to an operator, wherein the operator performs an action based on being provided the command; and
    associating a sentiment with one or more parts of the generated inventory.

6. The method of claim 1, further comprising:
    identifying that a hand of an operator is in a field of view of a camera that captures the video data of one or more portions of the one or more objects;
    identifying that the hand of the operator is not in the field of view of the camera when a first object of the one or more objects is in the field of view of the camera; and
    capturing an image of a portion of the first object based on the identification that the hand of the operator is not in the field of view of the camera when the first object is in the field of view of the camera.

7. The method of claim 1, further comprising associating a sentiment with at least one object of the one or more objects based on an analysis of the object image of the at least one object.

8. The method of claim 1, wherein the identified characteristics in the each object image include a classification in accordance with one or more indicators of sentiment in the object image.

9. The method of claim 1, wherein one or more of the characteristics are identified based on facial cues.

10. The method of claim 1, wherein one or more of the characteristics are identified based on optical character recognition and natural language processing.

11. The method of claim 1, wherein the identification of one or more of the characteristics is associated with a confidence level.

12. The method of claim 1, wherein the classification is based on a position of a part of the object image within the frame.

13. The method of claim 1, further comprising overlaying the relevant frames to generate an average frame, wherein the object image of the objects is identified from a part of the average frame.

14. A non-transitory computer-readable storage medium having embodied thereon a program executable by a processor for implementing a method for generating an inventory, the method comprising:
  collecting data that identifies a receptacle that contains a set of materials that include one or more objects;
  capturing video data of the one or more objects included in the set of materials, the video data including a series of frames;
  comparing a velocity of the objects in adjoining frames within the series of frames;
  identifying one or more frames of the adjoining frames as relevant based on identifying that the velocity is above a threshold;
  identifying an object image of one or more of the objects within a part of a frame from the relevant frames, wherein the part of the frame associated with the identified object image is delineated from a part of the frame associated with a background area;
  analyzing the object image within the frame to identify individual characteristics;
  classifying each of the one or more objects in the object image into a searchable hierarchy based on the identified characteristics;
  generating a set of data that cross-references a receptacle identifier and the characteristics included in each of the frames; and
  storing the set of data as part of the inventory.

15. The non-transitory computer-readable storage medium of claim 14, the program further executable to:
  identify that a start indication has been received, the start indication identifying that the capture of the video data can be initiated; and
  initiate the capture of the video data.

16. The non-transitory computer-readable storage medium of claim 14, the program further executable to:
  identify a background included in the set of video data when a piece of the set of materials originally contained in the receptacle is not within a field of view of a camera capturing the set of video data;
  identify that the field of view of the camera includes a first object of the one or more objects that was originally contained in the receptacle; and
  identify that the first object is a document.

17. The non-transitory computer-readable storage medium of claim 16, the program further executable to:
  converting information included in received audio data to text;
  converting information included in the set of video data into a first still image of the captured video data; and
  associating a first still image of the captured video data with the text based on the audio data being received at a time when the first still image was captured.

18. The non-transitory computer-readable of claim 14, the program further executable to provide a command to an operator, wherein the operator performs an action based on being provided the command.

19. An apparatus for generating an inventory, the apparatus comprising:
  a sensor that collects data that identifies a receptacle that contains a set of materials that include one or more objects;
  a camera that captures video data of the one or more objects included in the set of materials, the video data including a series of frames;
  a memory; and
  a processor that executes instructions out of the memory to:
    compare a velocity of the objects in adjoining frames within the series of frames;
    identify one or more frames of the adjoining frames as relevant based on identifying that the velocity is above a threshold;
    identify an object image of one or more of the objects within a part of a frame from the relevant frames, wherein the part of the frame associated with the identified object image is delineated from a part of the frame associated with a background area;
    analyze the object image within the frame to identify individual characteristics;
    classify each of the one or more objects in the object image into a searchable hierarchy based on the identified characteristics;
    generate a set of data that cross-references a receptacle identifier and the characteristics included in each of the frames, and
    store the set of data as part of the inventory.

20. The apparatus of claim 19, wherein the processor also executes the instructions to:
  identify that a start indication has been received, the start indication identifying that the capture of the video data can be initiated, wherein the one or more objects includes a document; and
  initiate the capture of the video data.

21. The apparatus of claim 19, wherein the camera is a video camera.

22. The apparatus of claim 21, wherein the processor also executes the instructions out of the memory to:
  identify a background included in the set of video data when a piece of the set of materials originally contained in the receptacle is not within a field of view of a camera capturing the set of video data;
  identify that the field of view of the camera includes a first object of the one or more objects that was originally contained in the receptacle; and
  identify that the first object is a document.

23. The apparatus of claim 22, further comprising a microphone that receives audio data when capturing the captured video data, wherein the processor also executes the instructions out of the memory to:
  convert information included in the audio data to text;
  convert information included in the set of video data into a first still image of the captured video data; and
  associate a first still image of the captured images with the text based on the audio data being received at a time when the first still image was captured.

* * * * *